A. A. AUSTIN.
SPEED RECORDING INSTRUMENT.
APPLICATION FILED FEB. 14, 1914.

1,170,724.

Patented Feb. 8, 1916.
3 SHEETS—SHEET 1.

WITNESSES:
C. A. Ellis
R. C. Bruckner

INVENTOR
A. A. Austin
BY
John M. Spellman
ATTORNEY

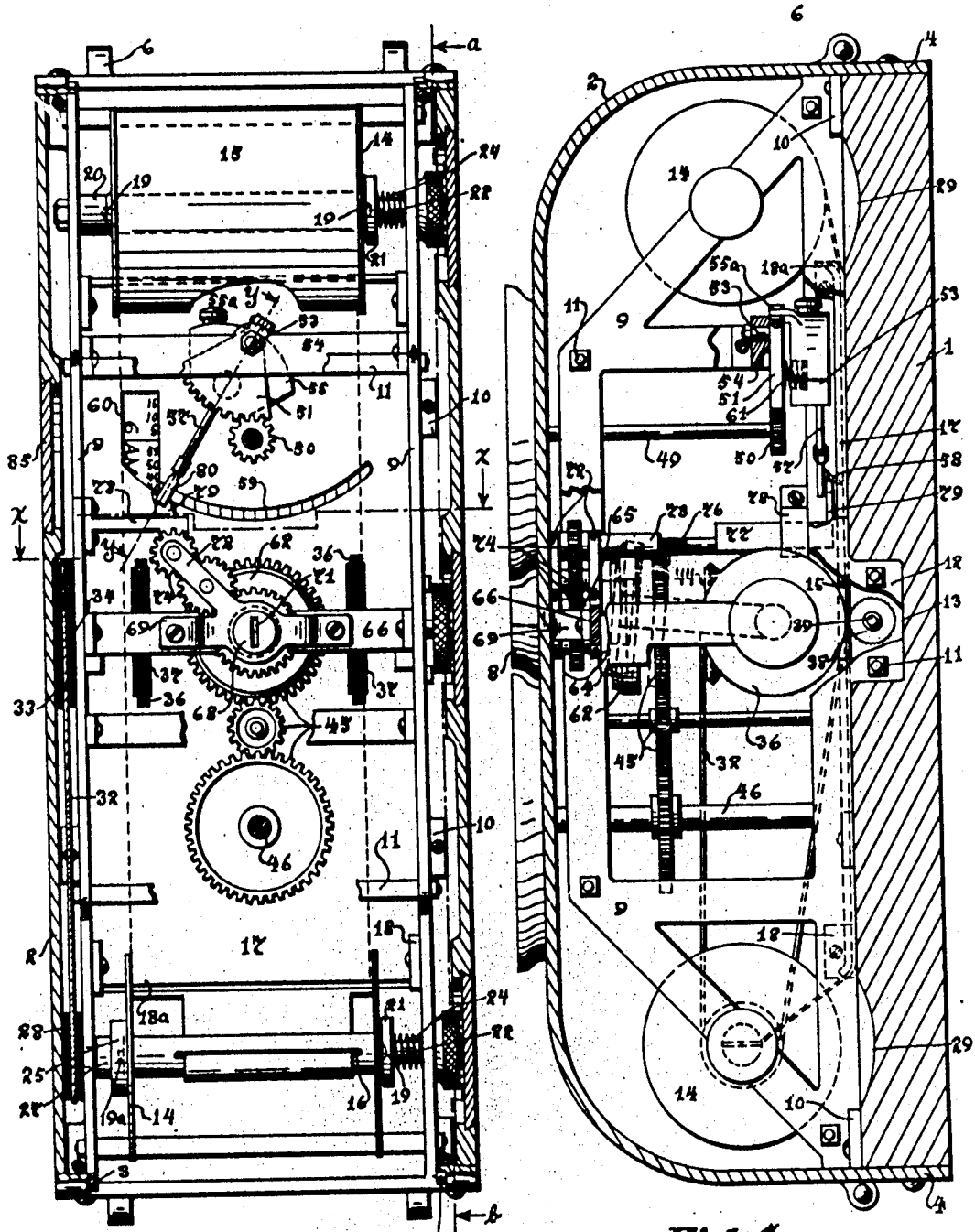

A. A. AUSTIN.
SPEED RECORDING INSTRUMENT.
APPLICATION FILED FEB. 14, 1914.

1,170,724.

Patented Feb. 8, 1916.
3 SHEETS—SHEET 3.

WITNESSES:
C. A. Ellis.
R. E. Bruckner.

INVENTOR
A. A. Austin
BY
John M. Spellman
ATTORNEY

UNITED STATES PATENT OFFICE.

ALBERT A. AUSTIN, OF DALLAS, TEXAS, ASSIGNOR OF ONE-FOURTH TO M. W. HULSEY AND ONE-FOURTH TO W. O. HULSEY, BOTH OF DALLAS, TEXAS.

SPEED-RECORDING INSTRUMENT.

1,170,724.    Specification of Letters Patent.    Patented Feb. 8, 1916.

Application filed February 14, 1914. Serial No. 818,724.

*To all whom it may concern:*

Be it known that I, ALBERT A. AUSTIN, a citizen of the United States, residing at Dallas, in the county of Dallas and State of Texas, have invented certain new and useful Improvements in Speed-Recording Instruments, of which the following is a specification.

My invention relates to a new and useful speed recording instrument for vehicles. Its object broadly stated is to provide an instrument that will produce an accurate record of the speed traveled by a vehicle at any time, and which will indicate further each time the machine is used and between what hours of the day so as to detect any unauthorized use of the car.

The object of my invention more specifically stated is to provide an instrument embodying a speed indicator and a clock, the dials of the same being readily visible from the driver's seat, the clock having the added function of imparting travel to a record sheet, upon which a pen or pencil connected with the speed indicator is actuated through a motion proportionate in its magnitude to the speed of the vehicle at any time.

A further object of the invention is to provide a mechanism which will serve to simultaneously remove said pen or pencil from contact with the record sheet, and discontinue the transmission of motion to the said sheet.

A still further object of the invention is to provide a device of the character described that will be strong, durable, efficient and simple and comparatively inexpensive to produce, also one in which the several parts will not be likely to get out of working order.

Figure 1:
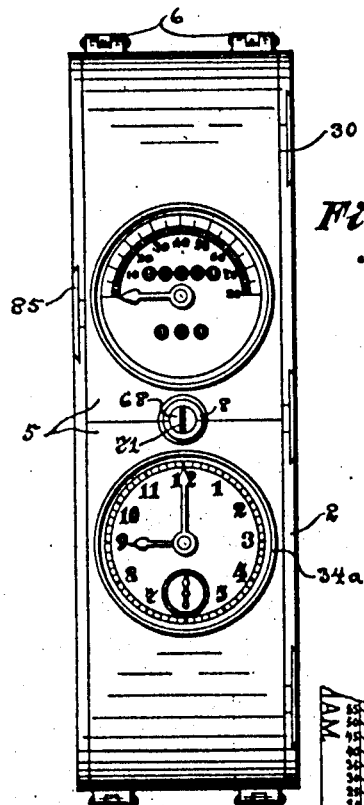
Figure 2:
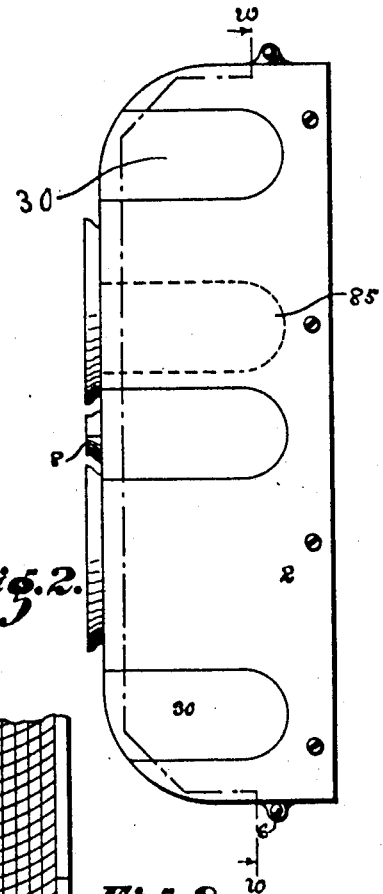
Figure 7:
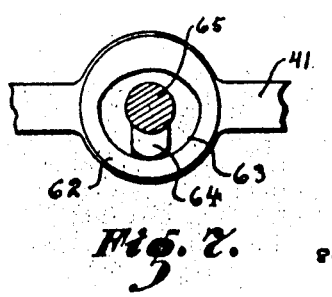
Figure 8:
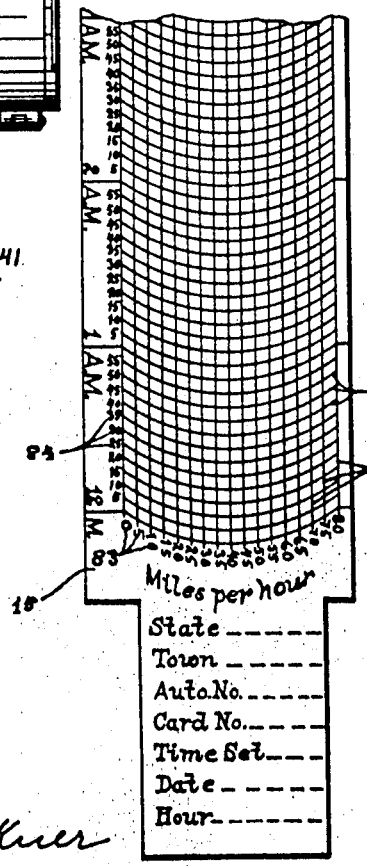
Figure 9:
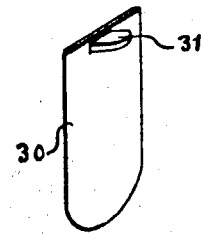
Figures 5, 6:
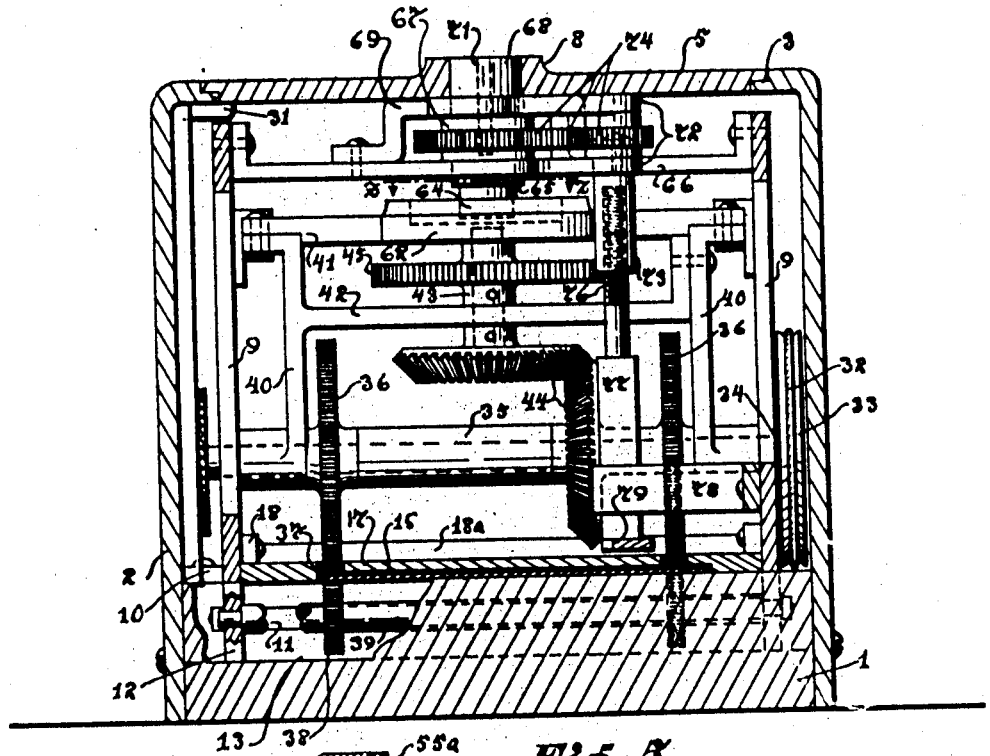

With the above and other objects in view, the invention has relation to certain novel features of construction and operation, an example of which is described in the following specification and illustrated in the accompanying drawings, wherein:

Figure 1 is a front view of my novel speed recording instrument. Fig. 2 is a view of the same in side elevation. Fig. 3 is a view taken upon the section line $w$—$w$ of Fig. 2, showing the instrument with the covers forming its front and top walls removed and a portion of the side walls cut away. Fig. 4 is a section taken upon the line $a$—$b$ of Fig. 3. Fig. 5 is a transverse sectional view, the section being taken upon the line $x$—$x$ of Fig. 3. Fig. 6 is a detail sectional view, the section being taken upon the line $y$—$y$ of Fig. 3. Fig. 7 is a detail sectional view taken upon the line $z$—$z$ of Fig. 5. Fig. 8 is a view showing an end portion of the record sheet. Fig. 9 is a detail perspective view of a sliding door several of which are provided to the casing of my instrument.

Like reference characters are employed in the accompanying drawing to designate similar parts in all the figures.

The casing of my speed recording instrument has a base or back 1 formed preferably of wood, to the opposite edges of which base, there are secured a pair of metal plates 2 constituting the sides of said casing, the two front corners thereof being preferably rounded. The front edges of the plates 2 are each provided with a slight flange 3, said flanges extending toward each other. To the extremities of the base 1, there are respectively secured two rectangular plates 4, to each of which a cover member 5 is hinged as indicated at 6. Each member 5 when in its closed position forms an e1 1 wall of the casing and forms one-half of the front wall thereof. The flanges 3 are made to form a seat for the cover members 5, by the formation upon said flanges of tongues, which are engaged by similar tongues formed upon the edges of the cover members as indicated at 7. The front portions of the two members 5 are respectively formed with equal circular apertures inclosed by annular flanges 8.

Within the casing, and adjacent to each side wall thereof there is mounted a frame 9, secured to the base 1 by a number of lugs 10. A further rigid connection between the two frames 9 is established by a plurality of bolts 11 two of which have their extremities mounted in lugs 12 respectively formed upon the frames 9 intermediate of their ends and projecting into a channel 13, extended across the interior face of the base 1.

Between the extremities of the frames 9, there are respectively mounted two reels 14, from the upper of which a record sheet 15 is adapted to wind upon the lower, the two reels being provided with slits 16, within which the extremities of the record sheet may be engaged. In its travel the record sheet is held closely adjacent to the base 1 by a guide plate 17 secured at its lateral edges to the frames 9 by a number of lugs 18, said plate being terminated at its extremities respectively adjacent to the two reels, and having said extremities curved slightly from the base 1, as indicated at 18ª. Upon each extremity of the upper reel, and upon one end of the lower one, a semispherical knob 19 is formed, the other extremity of the lower reel being provided with a square knob as indicated at 19ª. One of the knobs 19 of the upper reel is adapted to be recessed in a bearing 20 rigidly secured to the adjacent frame 9. At the other extremity of the upper reel and at the corresponding end of the lower reel, there are provided bearings 21 recessed to receive the adjacent knobs 19, each of said bearings being rigidly carried upon a stud-shaft 22 mounted in the adjacent frame 9 and carrying a milled head just exterior to said frame. Between said frame and each bearing 21, there is mounted a coiled spring 24 upon the correlated stud-shaft 22, the bearings 21 thus being normally held firmly pressed against the correlated reels to support the adjacent extremities of the same. The other extremity of the lower reel is adapted to be rotatably supported by a bearing 25 provided with a rectangular socket to receive the square knob 19ª, said bearing being carried fast upon one extremity of a stud-shaft 27 which is mounted in the correlated frame 9 and carries fast upon its other extremity a small sheave 28 adjacent to the exterior surface of said frame 9. In order that the casing may accommodate when desired a larger size of reel than that shown it is preferred to form in the base 1 a channel 29 of arcuate cross section opposite to each of the reels. When it is desired to remove a reel from either end of the casing, the corresponding member 5 is thrown open, and the stud-shaft 22 and the bearing 21 correlated with said reel are shifted slightly outward from the same, overcoming the correlated spring 24 and disengaging the correlated knob 19 from the bearing 21. It will now be possible to subject the reel to a slight displacement longitudinal of its axis sufficient to disengage the lug 19ª from the correlated bearing, after which the reel may be withdrawn from the casing. In order that ready access may be had to the milled heads 23, by grasping which head the corresponding bearings are disengaged from the correlated reels, there are provided in the side walls of the casing two sliding doors 30, having beveled edges adapted to engage in correspondingly formed slides in the edges of the doorway, the front end of each door 30 being provided with a lug 31 flush with the front of the casing, by gripping which lug the door may be withdrawn from its aperture.

To the sheave 28 rotation may be communicated through an endless cord 32 from a sheave 33, mounted in the middle portion of the casing upon one extremity of a shaft 34. The shaft 34 is parallel to the axes of the two reels and has its extremities respectively journaled in the two frames 9. Upon the center portion of the shaft 34, there is rotatably mounted a sleeve 35, having mounted fast upon its extremities similar wheels 36 having milled rims, and having contact with the record sheet through slots 37 formed in the guide plate 17. The record sheet is engaged between the rims of the wheels 36, and the rims of two smaller wheels 38 mounted fast upon a shaft 39 disposed within the channel 13, and having its extremities journaled in the lugs 12. When rotation is communicated to the shaft 34, the record sheet is actuated downwardly between the pairs of drive wheels 36 and 38, and the lowermost reel is driven through the sheaves 28 and 33 and the cord 32 at a sufficient rate of speed to wind up the record sheet on the lower reel as fast as it is actuated downwardly by said drive wheels. It may be the case at times that the drive wheels 36 and 38 will not permit the lower reel to rotate at the speed which the cord 32 tends to communicate to said reel, in which event said cord will slip upon the lowermost sheave.

A mechanism serving to communicate rotation to the shaft 34 from the works of a clock 34ª mounted within the bottom portion of the casing, and seen in Fig. 1 through the aperture in the lower cover member 5 will now be described.

At each side of the sleeve 35, there are pivoted upon the shaft 34 the rear extremities of two arms 40, which arms together with two cross bars 41 and 42 rigidly connecting the same constitute a substantially horizontal frame adapted to undergo a certain slight angular displacement about the shaft 34. The cross-bar 41 connects the forward extremities of the arms 40, while the bar 42 is spaced a short distance to the rear of the bar 41. The two bars 41 and 42 furnish bearings for a short shaft 43 perpendicular to the shaft 34 and adapted to drive the latter shaft through a pair of beveled gears 44. The shaft 43 is adapted to be driven through a train of gears 45 from the central shaft 46 of the clock 34ª, the rotation transmitted being a very gradual one. The clock 34ª is illustrated only in Fig. 1, being omitted from the other views to simplify the same.

In the upper portion of the casing, there is mounted an ordinary speedometer, which is illustrated in Fig. 1, being visible through the flanged aperture in the upper member 5. To simplify the other views, the speedometer is omitted therefrom. Upon the central shaft 49 of the speedometer, there is mounted fast a pinion 50 which intermeshes with a segmental gear 51, fast upon a stud shaft 53 journaled in a bar 54 extended rigidly between the front edges of the frames 9. The members 50 and 51 are mounted in the upper rear portion of the casing of my instrument, and between the segment 51 and the guide plate 17, there is mounted an ink well 55, having at its top a hinged connection with the segmental gear as indicated at 55ª, said hinged connection being such that the ink well is permitted by the same to undergo a slight angular displacement to or from the adjacent guide plate 17. With the bottom of the ink well 55, there communicates the upper end of a metal tube 57 perpendicular to the axis of rotation established by the shaft 49, about which axis the segment 51 and the ink well are adapted to rotate as a unit. The tube 57 extends downwardly parallel and adjacent to the plate 17, and carries at its lower end a pen 58 bearing upon the record sheet through an arcuate slot 59 within the member 17, the center of curvature of the slot 59 being established by the shaft 53. At one extremity of the slot 59, an upwardly extended aperture 60 has communication with said slot, the purpose of which is hereinafter explained. That wall of the ink well 55 which is adjacent to the segment 51 is formed with a recess receiving a coiled spring 61, which is under a certain degree of compression, sufficient to maintain the pen 58 normally in firm contact with the record sheet.

The cross bar 41 is formed with a central circular portion 62 of increased thickness, in the front face of which portion, there is formed a cam shaped depression 63. Into this depression, there projects a cam 64 rigidly carried by a short horizontal shaft 65, transversely journaled at the center of a cross bar 66 rigidly extended between the forward edges of the two frames 9. The forward end of the shaft 65 abuts against a head 67 fast upon the rear end of a cylinder 68 transversely journaled in an arched bracket 69 mounted upon the cross-bar 66 in front of the same. When the covers 5 are in their closed position, the front end portion of the cylinder 68 will project between said covers, semi-circular flanges being formed upon the adjacent edges of the two covers to receive the projecting portion of said cylinder. A slot 71 of rectangular cross section is extended axially through the cylinder 68 and is continued into the adjacent extremity of the shaft 65, the function of said slot being hereinafter made clear. With the members 66 and 69, there are respectively formed integral a pair of parallel arms 72 which extend upwardly at an inclination toward one of the side walls. The free extremities of the arms 72 form bearings for the forward extremity of a shaft 73, to which rotation may be communicated from the shaft 65 through a train of gears 74 mounted between the two arms 72. The rear end portion of the shaft 73 is provided with an interiorly threaded aperture 75, into which projects the threaded extremity of a screw 76 having a head 77 of square cross section and elongated parallel to said screw. The head 77 of the screw 76 is slidably received by a bracket 78 rigidly mounted upon the adjacent frame 9. At the rear extremity of the head 77, there is formed upon the same an arm 79 which engages behind a lug 80 formed upon the free end of the tube 57. When the integral parts 76, 77 and 79 are displaced toward the front of the casing, the parts 55, 57 and 58 will be swung about the hinge 55ª displacing the pen 58 from contact with the record sheet.

It will be observed that the recording surface of the record sheet carries a plurality of transversely curved equidistant lines 81, and a plurality of equidistant lines 82 parallel to the longitudinal edges of the sheet. At the extremities of the sheet, the longitudinally extending lines are associated with a series of numbers 83 increasing from zero to 80 in multiples of 5, and adjacent to said series of numbers there is printed upon the sheet the words "Miles per hour".

At the left side of the record sheet, there is associated with the curved lines 81 a series of numbers 84, which are increased upwardly of the sheet in multiples of 5 from zero to sixty, the series being renewed when sixty is reached. Between the several series of numbers 84, there are provided horizontal lines with which are correlated a series of numbers designating hours and increasing upwardly of the sheet as follows: 12 m., 1 a. m., 2 a. m., 3 a. m., etc. In order that the record upon the sheet may be observed at any time, there is provided in the left hand side wall of the casing a sliding door 85 similar to the doors 30 previously described as provided in the left hand wall of the casing.

The operation of the above described invention will now be fully explained.

It is first to be observed that the ordinary functions of the clock 34ª and the speedometer 48 are not interfered with by the embodiment of said instruments in my invention, since the dials of the said instruments may be read without difficulty through the apertures provided for that purpose in the front of the casing. In addition to their ordinary functions, the clock 34ª serves in my invention to actuate the travel of the record sheet, and the speedometer serves to actuate the transverse motion of a pen upon the record sheet. The operation of the mechanism actuating the record sheet from the clock is believed to be clear from the foregoing description. It is to be noted, however, that the rate of speed at which the record sheet travels downwardly is such as to displace said sheet through the distance between two of the lines 81 in five minutes. Furthermore, it is to be understood that the correct time will be indicated by the position of the pen relative to the column of numbers 84 on the record sheet and in first putting the instrument in use it is necessary both to set the clock correctly and shift the record sheet manually until the correct time is indicated opposite to the pen.

When the vehicle with which my invention is correlated is stationary, the pen 58 will bear upon the line 82 of the record sheet with which the numeral 0 is associated and will produce a line coincident with the same. For each increase of five miles per hour in the speed of the vehicle, the pen will shift its position upon the sheet toward the right a distance equal to that between two of the lines 82. It is clear therefore that the travel of the record sheet in conjunction with the motion of the pen 58 will produce upon said sheet a line which will constitute a record of the speed traveled by a vehicle at any time during its travel.

When the ink well is being replenished or a new record sheet is being placed in the casing it is necessary to discontinue the travel of the record sheet and raise the pen 58 out of contact with said sheet. This result may be accomplished by inserting in the slot 71 a key, shaped to fit said slot, and through said key communicating rotation to the shaft 65. The train of gears 74 will communicate this rotation to the shaft 73, and since the screw 76 is threaded into the shaft 73 but cannot rotate with said shaft, said screw will be subjected to a longitudinal displacement which will shift the pen 58 clear of the record sheet. To cut off the communication of travel to the record sheet the cam 64 will be adjusted to an upwardly pointing position in the recess 63, in which position, the frame comprising the members 40, 41 and 42 will be sufficiently elevated at its free end to disengage the teeth of the uppermost gear of the train 45 from the other gears of said train. In Fig. 4 there is illustrated in dash lines the position which the frame comprised by the members 40, 41 and 42 assumes when it is desired to discontinue the travel of the record sheet. It is intended to keep the clock 34ᵃ constantly wound so that the travel of the record sheet will be continuous both day and night. Thus if unauthorized use of the car equipped with my device is at any time made, the owner will become at once aware of the fact by consulting his record sheet and will know just when and for how long the car was used without his consent.

Since the maximum speed of a car and the period of time for which it may be left standing in the city streets is now usually regulated by law, the owner of a car equipped with my device is protected against arrest and fines based upon misstatements since he can positively prove by his record sheet that his speed between any certain hours was not excessive or that his car was not standing unduly long.

Even though some person, before making unauthorized use of the car, were to use a key and stop the travel of the record sheet, this would not prevent discovery of such an act by the owner since the time indicated by the pen upon the record sheet (in the series 84) would be slow as many minutes as the travel of the sheet was interrupted.

The invention is presented as including all such modifications and changes as properly come within the scope of the following claims.

What I claim is:

1. In a speed recording instrument, the combination with a record sheet, of means for actuating the same, a marking device bearing upon the record sheet, and a mechanism simultaneously shifting the marking device out of contact with the record sheet and for discontinuing the communication of travel to said sheet.

2. In a speed recording instrument, the combination with a record sheet, of means for actuating the same, a marking device bearing upon the record sheet and actuated in arcuate travel transverse of said sheet, two alined shafts perpendicular to the record sheet and having end portions threaded one within the other, a mechanism for manually subjecting one of said shafts to rotation, means for restricting the other shaft against rotation, but permitting sliding motion of the same, and means carried by the last mentioned shaft engaging the marking device, for shifting said device from contact with the record sheet.

3. In a speed recording instrument, the combination with a record sheet, of means for actuating the same, a marking device actuated in an arcuate travel transverse of the record sheet, a frame pivoted to swing about an axis parallel and transverse with the record sheet, said frame having a cam shaped aperture in its free end, a shaft perpendicular to the record sheet projecting into said recess, a cam within said recess serving to subject the pivoted frame to an angular displacement when subjected to rotation, a mechanism actuated by said shaft serving to withdraw the marking device from contact with the record sheet, the angular displacement of said frame serving to cut off communication of travel to the record sheet.

In testimony whereof I have signed my name to this specification in the presence of two subscribing witnesses.

ALBERT A. AUSTIN.

Witnesses:
R. E. C. BRUCKNER,
JACK A. SCHLEY.

Copies of this patent may be obtained for five cents each, by addressing the "Commissioner of Patents, Washington, D. C."